(12) United States Patent
Katsuki et al.

(10) Patent No.: US 7,641,169 B2
(45) Date of Patent: Jan. 5, 2010

(54) SUBSTRATE FOR A STAMPER

(75) Inventors: Futoshi Katsuki, Osaka (JP); Kunihiro Fukui, Osaka (JP); Atsuhiko Kuroda, Jyoetsu (JP)

(73) Assignee: Sumitomo Metal Industries, Ltd., Osaka (JP)

( * ) Notice: Subject to any disclaimer, the term of this patent is extended or adjusted under 35 U.S.C. 154(b) by 0 days.

(21) Appl. No.: 11/288,166

(22) Filed: Nov. 29, 2005

(65) Prior Publication Data

US 2006/0131474 A1 Jun. 22, 2006

Related U.S. Application Data

(63) Continuation of application No. PCT/JP2004/007389, filed on May 28, 2004.

(30) Foreign Application Priority Data

May 29, 2003 (JP) .............................. 2003-152702

(51) Int. Cl.
B28B 11/04 (2006.01)
B29C 33/56 (2006.01)
B32B 15/00 (2006.01)

(52) U.S. Cl. ..................... 249/135; 249/114.1; 249/116

(58) Field of Classification Search ...... 249/114.1–116, 249/134–135; 264/285, 1.1; 427/548; 72/47; 425/403, 385, 470, 810; 106/38.2, 38.22
See application file for complete search history.

(56) References Cited

U.S. PATENT DOCUMENTS

| | | | | | |
|---|---|---|---|---|---|
| 3,108,009 | A | * | 10/1963 | Clancy et al. | 428/317.9 |
| 4,363,844 | A | * | 12/1982 | Lewis et al. | 428/848.5 |
| 4,447,381 | A | * | 5/1984 | Matey | 264/107 |
| 4,482,511 | A | * | 11/1984 | Komatsubara | 264/483 |
| 4,723,903 | A | * | 2/1988 | Okazaki et al. | 425/385 |
| 5,320,514 | A | * | 6/1994 | Kanome et al. | 425/194 |

(Continued)

FOREIGN PATENT DOCUMENTS

CN 1355856 A 6/2002

(Continued)

OTHER PUBLICATIONS http://en.wikipedia.org/wiki/Nickel.*

(Continued)

*Primary Examiner*—Philip C Tucker
*Assistant Examiner*—Dimple N Bodawala
(74) *Attorney, Agent, or Firm*—Clark & Brody

(57) ABSTRACT

A preparing method for a substrate for a stamper where the entirety of the metal rolled plate can be used as the material for the substrate so that a high yield in the preparation can be maintained is provided. A metal is rolled so as to generate a metal rolled plate, the metal rolled plate that is generated is cut to a predetermined size, and metal plating is operated on the front surface or the rear surface, or both the front and rear surfaces, of the metal rolled plate that has been cut to a predetermined size, and then, a polishing process is operated. A target plate thickness that is set when the metal rolled plate is rolled is smaller than the plate thickness that is required at the time of completion of the polishing process.

4 Claims, 7 Drawing Sheets

U.S. PATENT DOCUMENTS

| | | | |
|---|---|---|---|
| 5,456,866 A * | 10/1995 | Kanome et al. | 264/1.33 |
| 5,458,985 A * | 10/1995 | Isono et al. | 428/601 |
| 5,538,802 A * | 7/1996 | Kitaori et al. | 428/836.3 |
| 5,820,898 A * | 10/1998 | Yasuda | 425/542 |
| 6,099,287 A * | 8/2000 | Higashida et al. | 425/190 |
| 6,352,656 B1 * | 3/2002 | Kimura et al. | 264/2.5 |
| 6,365,329 B2 * | 4/2002 | Kerfeld | 430/321 |
| 6,627,020 B2 * | 9/2003 | Natarajan et al. | 156/89.12 |
| 6,671,242 B1 | 12/2003 | Ootera | |
| 2001/0003384 A1 * | 6/2001 | Morita | 264/219 |
| 2003/0173690 A1 * | 9/2003 | Murata et al. | 264/1.34 |
| 2003/0178118 A1 * | 9/2003 | Ishihara | 156/1 |
| 2004/0115361 A1 * | 6/2004 | Aegerter et al. | 427/430.1 |
| 2004/0202865 A1 * | 10/2004 | Homola et al. | 428/421 |
| 2005/0167868 A1 * | 8/2005 | Takeda et al. | 264/1.33 |

FOREIGN PATENT DOCUMENTS

| | | | |
|---|---|---|---|
| DE | 199 19 764 A1 | 11/2000 | |
| EP | 418017 A2 * | 3/1991 | |
| EP | 540 842 A1 | 5/1993 | |
| EP | 1489609 A1 * | 12/2004 | |
| JP | 2-122064 | 5/1990 | |
| JP | 3-24946 | 2/1991 | |
| JP | 6-275770 | 9/1994 | |
| JP | 7-126806 | 5/1995 | |
| JP | 11-293408 | 10/1999 | |
| JP | 2000-113524 | 4/2000 | |
| JP | 2000345266 A * | 12/2000 | |
| JP | 2000348394 A * | 12/2000 | |
| JP | 2000348395 A * | 12/2000 | |
| JP | 2002-92946 | 3/2002 | |
| KR | 10-0248442 | 3/2000 | |
| WO | 97/37348 | 10/1997 | |

OTHER PUBLICATIONS

Translation of DE 199 19 764.*

* cited by examiner

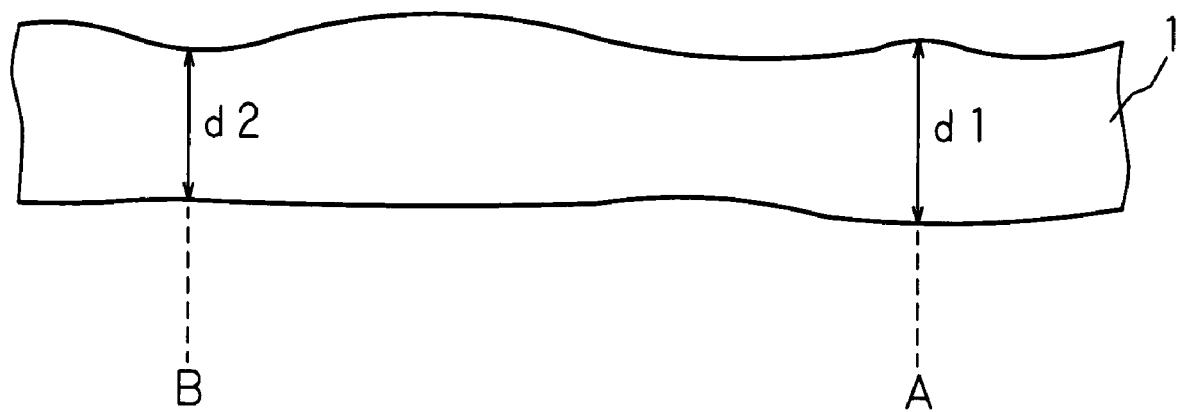
F I G. 1

(a)

(b)

(c)

F I G. 5
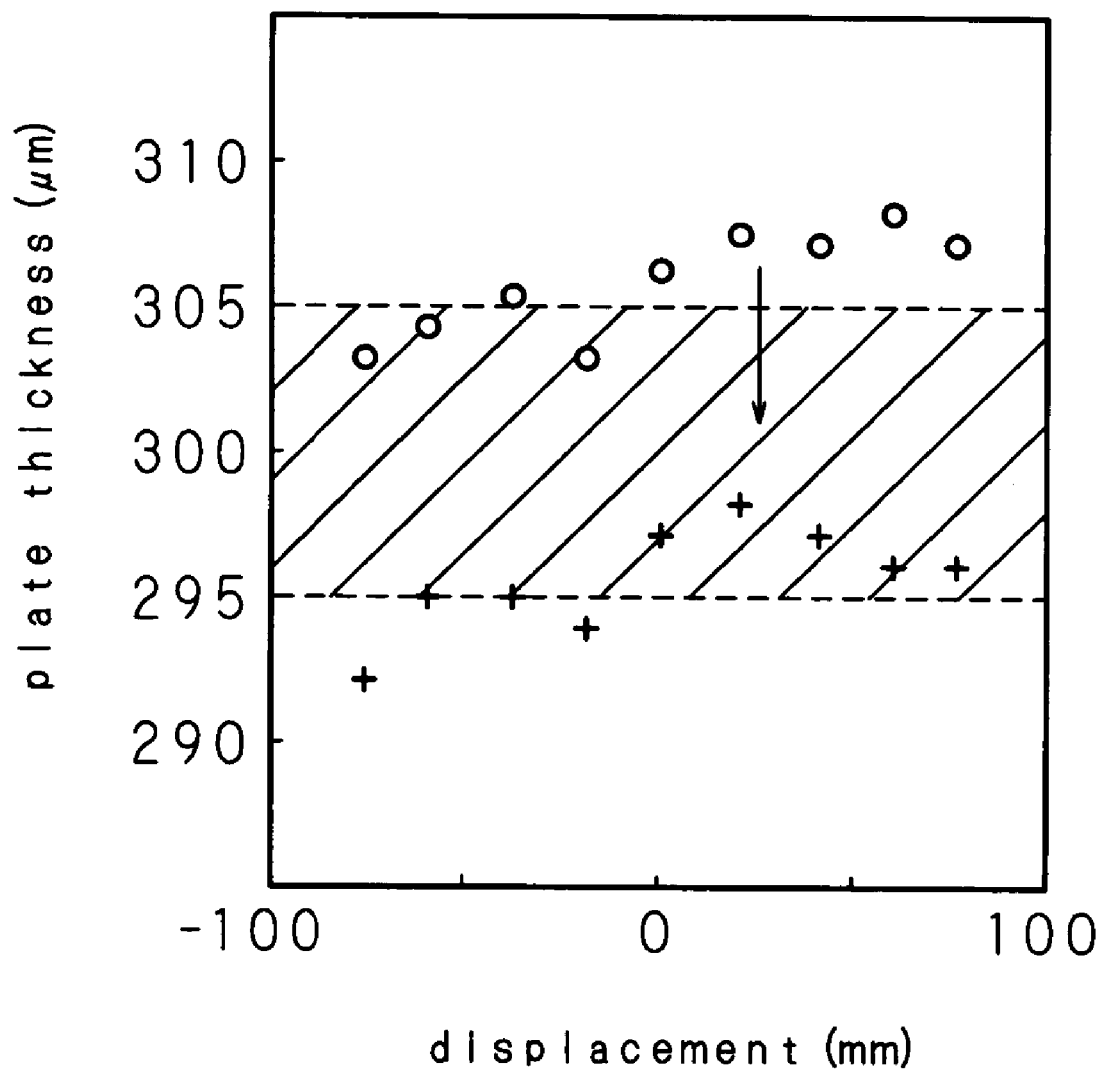

F I G. 6
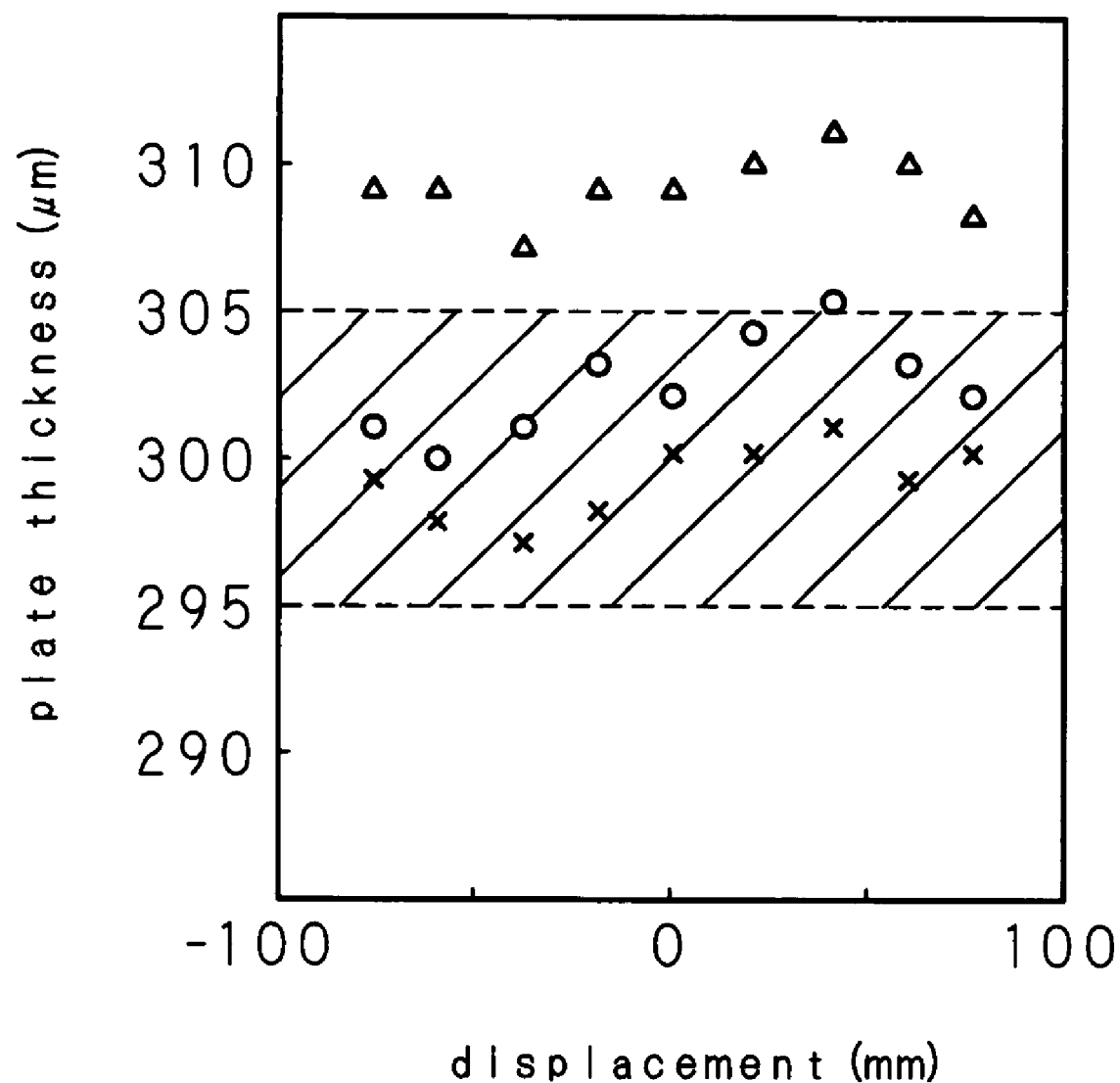

SUBSTRATE FOR A STAMPER

This application is a continuation of PCT International Application No. PCT/JP2004/007389 which has an International filing date of May 28, 2004 and designated the United States of America.

TECHNICAL FIELD

The present invention relates to a substrate for a stamper that is used to prepare a stamper for duplicating a large amount of optical discs, such as CD's (compact discs) and DVD's (digital versatile discs), as well as a preparing method for such a substrate for a stamper.

BACKGROUND ART

Pits on a sub-micron scale for recording signals are formed on optical discs, such as CD's or DVD's. Therefore, the surface of a substrate for a stamper requires an extremely high degree of flatness. In order to satisfy this requirement, conventionally, a nickel film is grown on the surface of a glass substrate that has been mirror polished in accordance with an electroforming method, and thereby, a substrate for a stamper having a high degree of flatness is prepared.

However, the thickness of a substrate for a stamper is, in general, approximately 300 µm. Accordingly, in accordance with an electroforming method where a nickel film is grown in order to prepare a substrate for a stamper made of nickel, the electric power consumption for growing the nickel film to the thickness of approximately 300 µm, which is the thickness of the substrate for a stamper, becomes too large, and thus, this method is not preferable, from the point of view of the cost for preparation. In addition, waste liquid is created through plating, which is not desirable, from the point of view of an increase in the cost for processing of the waste liquid and protection of the environment.

Therefore, a method for preparing a substrate for a stamper where a metal plate, for example, a rolled plate, that has been prepared through rolling from nickel or a nickel alloy (hereinafter referred to as Ni rolled plate) is cut to a predetermined size, which is then polished, has been proposed, in order to reduce the cost for preparation.

Patent Document 1 discloses, for example, a preparing method for a substrate for a stamper where an Ni rolled plate is used as the substrate for a stamper, and a chemical and mechanical polishing process is operated on the surface. In addition, Patent Document 2 discloses a method for preparing a substrate for a stamper where a chemical and mechanical polishing process is operated on a metal material that has been punched out from a hoop in coil form.

Patent Document 1: Japanese Patent Application Laid-Open No. 2002-355749
Patent Document 2: Japanese Patent Application Laid-Open No. 2001-283475

DISCLOSURE OF THE INVENTION

Problem to be Solved by the Invention

Such a metal plate is usually prepared through cold rolling and annealing. A metal plate that has undergone such a preparing process has the following problems.

A non-metallic inclusion exists inside the material in a state where a portion thereof is exposed from the surface of the metal plate. Therefore, in the case where a plating process is operated on the metal plate, the electric conductivity of the non-metallic inclusion is low, and therefore, a so called pinhole defect, a defect such that no plating is attached, occurs. The occurrence of pinhole defects makes the surface of the plating coarse, and weakens the adhesion of the plating to the base material, and in extreme cases, there is a risk that peeling of the plating may occur during the polishing process.

Usually, residual stress occurs in a metal plate that is prepared through rolling. Accordingly, in the case where only one surface is polished, the residual stress is unbalanced between the two surfaces, front and rear, and a problem arises, where the metal plate is significantly bended. It is desirable, in order to prevent such bending, to make the rate of reduction in the pressure during temper rolling as small as possible, and to make the pressure at the time of rolling uniform by using a tension leveler or the like. It is difficult, however, merely with the above described measure for dealing with the problem, to prevent bends from occurring after the polishing process has been operated on the surface of the metal plate.

In addition, it is necessary to secure the metal plate to a platen in order to polish the surface in the preparing process for a substrate for a stamper. This is the same at the time of injection molding of CD's, DVD's and the like. In the case where the metal plate is secured to a platen, usually, the metal plate is sucked against and secured to the surface of the platen. Accordingly, there are intrinsic problems, such that removal of the metal plate from the platen after the polishing process is difficult, in the case where no bends have occurred in the metal plate, while suction against the platen becomes difficult in the case where bending in the metal plate is excessive.

Furthermore, it is preferable, in order to reduce the cost for preparation for a substrate for a stamper before the polishing process, as disclosed in Patent Document 1, to proceed to the polishing process immediately after a predetermined size has been cut out from an Ni rolled plate that has been prepared through rolling. However, tolerance in the plate thickness that is required for a stamper is approximately ±2%, as opposed to the tolerance in the plate thickness of the Ni rolled plate that has been prepared through rolling, which is approximately ±10% throughout the entire length. Accordingly, there is a problem, where it is difficult to use the entire length of an Ni rolled plate as a substrate for a stamper, because the same level of precision as in the stamper is required in the substrate for a stamper.

That is to say, as shown in FIG. 1, it could become the case that the thickness d1 of an Ni rolled plate 1 is 310 µm in a portion A while the thickness d2 is 300 µm in a portion B. In such a case, the thickness of the Ni rolled plate that has been cut out before the polishing process needs to be 310 µm, including polishing margins, when the plate thickness that is required for the substrate for a stamper is 300 µm, and polishing margins on the two surfaces, front and rear, are 10 µm in total. Accordingly, a substrate for a stamper that satisfies the requirement (that is to say, a thickness of 300 µm and a tolerance in the plate thickness of ±2%) can be fabricated from the portion A, while a substrate for a stamper that satisfies the requirement cannot be fabricated from the portion B. As described above, in the case where a number of substrates are cut out from different places in one sheet (or one coil) of an Ni rolled plate, a substrate for a stamper that satisfies the requirements can be fabricated only from substrates that have been cut out from specific places, making it difficult to maintain a high yield in the preparation.

The present invention is provided in view of the above described situation, and an object thereof is to provide a substrate for a stamper and a preparing method for a substrate for a stamper where the degree of flatness on the surface can be maintained high after the polishing process, by preventing pinhole defects due to a non-metallic inclusion from occurring at the time of a metal plating process.

In addition, another object of the present invention is to provide a substrate for a stamper and a preparing method for a substrate for a stamper where removal from a platen after the polishing process is easy, and suction against the platen can be operated without fail, by causing appropriate bending in the metal plate.

Furthermore, still another object of the present invention is to provide a preparing method for a substrate for a stamper where the entirety of the metal rolled plate can be used as the material for a substrate for a stamper, and the yield in the preparation can be maintained high.

Means for Solving Problem

In order to achieve the above described objects, a substrate for a stamper according to the first invention is characterized in that a coating process is operated on the front surface or the rear surface, or both the front and rear surfaces on a plate.

In the substrate for a stamper according to the first invention, the thickness of the coating film can be made smaller, in comparison with a case where a thick film of metal plating is generated in accordance with an electroforming method. Accordingly, the electric power consumption and the time that is required for the preparation can be reduced, and it becomes possible to reduce the cost for preparation.

In addition, a substrate for a stamper according to the second invention is the substrate for a stamper according to first invention, characterized in that the above described plate is made of metal.

In the substrate for a stamper according to the second invention, the plate is made of metal where the thickness of the metal plating film can be made smaller, in comparison with a case where a thick film of metal plating is generated in accordance with an electroforming method. Accordingly, the electrical power consumption, the time that is required for the preparation, and the amount of expendable supplies that are used for plating can be reduced, and it becomes possible to reduce the cost for preparation.

In addition, a substrate for a stamper according to the third invention is the substrate for a stamper according to the second invention, characterized in that the degree of purity of a non-metallic inclusion in the above described plate material is no greater than 0.05%.

In the substrate for a stamper according to the third invention, the degree of purity, which indicates the weight ratio of a non-metallic inclusion that exists in the metal plate is no greater than 0.05%. As a result of this, the possibility that a non-metallic inclusion is exposed from the surface can be lowered, and it becomes possible to prevent pinhole defects from occurring in the case where metal plating is operated.

In addition, a substrate for a stamper according to the fourth invention is the substrate for a stamper according to any of the first to third inventions, characterized in that bending of the plate that is cut out is no less than 0.1 mm, in the case where the plate is cut to a predetermined size.

In the substrate for a stamper according to the fourth invention, bending of the plate that has been cut out is no less than 0.1 mm in the case where the plate is cut to a predetermined size. Accordingly, it becomes possible to easily remove the plate, by inserting a jig or the like between the plate and the platen.

In addition, a substrate for a stamper according to the fifth invention is the substrate for a stamper according to any of the second to fourth inventions, characterized in that the above described plate has at least one main composition as follows: pure nickel, nickel alloys, pure titanium, titanium alloys, stainless steel, iron, iron alloys, pure copper, copper alloys, pure aluminum, aluminum alloys, pure magnesium and magnesium alloys.

In the substrate for a stamper according to the fifth invention using such a metal material and a metal plating film, the above described effects can be expected.

In addition, a substrate for a stamper according to the sixth invention is the substrate for a stamper according to any of the first to fifth inventions, characterized in that a polishing process is operated on at least one surface on which coating of the above described plate is operated.

In the substrate for a stamper according to the sixth invention, the thickness of the coating film can be made smaller than in the case where a thick film of metal plating is generated in accordance with an electroforming method. Accordingly, the electrical power consumption, the time that is required for the preparation, and the amount of expendable supplies that are used for plating can be reduced, and it becomes possible to reduce the cost for preparation.

Next, in order to achieve the above described objects, a preparing method for a substrate for a stamper according to the seventh invention is characterized in that metal plating is operated on the front surface or the rear surface, or both the front and rear surfaces, of a metal rolled plate that is prepared by rolling a metal and cut to a predetermined size, and then, a polishing process is operated.

In addition, a preparing method for a substrate for a stamper according to the eighth invention is characterized in that a metal is rolled so as to prepare a metal rolled plate, the metal rolled plate that is prepared is cut to a predetermined size, metal plating is operated on the front surface or the rear surface, or both the front and rear surfaces, of the metal rolled plate that has been cut to a predetermined size, and then, a polishing process is operated.

In accordance with the preparing methods for a substrate for a stamper according to the seventh and eighth inventions, fine adjustments are made through metal plating to the plate thickness of a metal rolled plate that is prepared through rolling. Accordingly, the plate thickness is adjusted before the polishing process is operated, and therefore, a situation where a portion that cannot be utilized due to a lack in the plate thickness can be prevented, by operating a polishing process on a metal rolled plate, and it becomes possible to maintain a high yield in the preparation. In addition, the thickness of the plating film can be made smaller than in the case where a thick film of metal plating is generated in accordance with an electroforming method. Accordingly, the electrical power consumption, the time that is required for the preparation, and the amount of expendable supplies that are used for plating can be reduced, and it becomes possible to reduce the cost for preparation.

In addition, a preparing method for a substrate for a stamper according to the ninth invention is the preparing method for a substrate for a stamper according to the seventh or eighth invention, characterized in that the target plate thickness that is set when the above described metal rolled plate is rolled is smaller than the thickness that is gained by adding polishing margins to the plate thickness that is required at the time of completion of the polishing process (plate thickness that is typically required for a substrate for a stamper).

In accordance with the preparing method for a substrate for a stamper according to the ninth invention, a substrate for a stamper that satisfies the requirements for the entire length of the metal rolled plate can be fabricated, and it becomes possible to maintain a high yield in the preparation. As described above, in some cases, the error in the plate thickness of the metal rolled plate that is prepared through rolling becomes approximately ±10% throughout the entirety of one coil. In this case, rolling is operated for a target plate thickness that is gained by adding polishing margins to the plate thickness that is required for a substrate for a stamper, causing portions that are too thin and portions that are too thick.

In the case where, for example, the required plate thickness for the substrate for a stamper is 300 µm and the polishing margin in the polishing process is 10 µm, a metal rolled plate having a thickness of 310 µm may be prepared. However, in the case where rolling is operated for a target of 310 µm, inconsistency in the plate thickness occurs, for example, between 280 µm and 340 µm. That is to say, the thickness d2 of the metal rolled plate 1 of FIG. 1 is thin in the portion B, and the target plate thickness cannot be secured. Therefore, in the case where the plate thickness is too small, a plating layer can be added by plating, so that the lack in the plate thickness can be compensated for. In the case where, for example, the plate thickness of a substrate that is cut out from an arbitrary portion of a metal rolled plate is 290 µm, 10 µm of plating can be applied to both the front and rear surfaces of the substrate, and thereby, the lack in the plate thickness can be compensated for.

In the case where the plate thickness is too great, however, a polishing process must be operated, so that the plate thickness reaches the required thickness. It is disadvantageous to greatly reduce the plate thickness through a polishing process, from the view point of cost and time for work. Accordingly, it is desirable to set the target plate thickness small enough to minimize portions where the plate thickness becomes too great.

How small the thickness can be set may be determined taking into consideration the size and the probability of the occurrence of errors in the plate thickness, which occur at the time of rolling. That is to say, the target thickness at the time of rolling may be set so that the plate thickness of a metal rolled plate in the case where an error in the plate thickness has occurred in the direction of increasing the plate thickness (plus direction), becomes equal to the plate thickness that is gained by adding polishing margins to the plate thickness of a substrate for a stamper, as described above.

In addition, a preparing method for a substrate for a stamper according to the tenth invention is the preparing method for a substrate for a stamper according to any of the seventh to ninth inventions, characterized in that the total thickness of metal plating which is operated on the front surface or the rear surface, or both the front and rear surfaces, of a metal rolled plate is a thickness that is gained by subtracting the thickness of the above described metal rolled plate from the thickness that is gained by adding the thickness of the polishing margins in the above described polishing process to the thickness that is required at the time of completion of the polishing process.

In accordance with the preparing method for a substrate for a stamper according to the tenth invention, the plate thickness can be adjusted throughout the entire length of a metal rolled plate. Accordingly, a substrate for a stamper that satisfies the requirements can be fabricated wherever it is cut out from the metal rolled plate, and it becomes possible to maintain a high yield in the preparation.

In addition, a preparing method for a substrate for a stamper according to the eleventh invention is the preparing method for a substrate for a stamper according to any of the seventh to tenth inventions, characterized in that the main composition of metal plating that is operated on the front surface or the rear surface, or both the front and rear surfaces, of a metal rolled plate is the same as that of the above described metal.

In accordance with the preparing method for a substrate for a stamper according to the eleventh invention, a metal material that is of the same type as the metal material for a metal rolled plate is used, and thereby, thermophysical properties that affect the substrate for a stamper become the same at the time of the formation of an optical disc using the fabricated substrate for a stamper. Accordingly, peeling or the like of the plating film is unlikely to occur, and it becomes possible to maintain the substrate for a stamper highly reliable.

In addition, a preparing method for a substrate for a stamper according to the twelfth invention is the preparing method for a substrate for a stamper according to any of the seventh to eleventh inventions, characterized in that the main composition of said metal is at least one of nickel, titanium, iron, copper and aluminum.

In accordance with the preparing method for a substrate for a stamper according to the twelfth invention, such a metal material and metal plating film are used, and thereby, effects as those described above can be expected.

Effects of the Invention

In accordance with the substrates for a stamper according to the first, second and sixth inventions, the thickness of the coating film (metal plating film) can be made smaller than in the case where a thick film of metal plating is generated in accordance with an electroforming method. Accordingly, the electrical power consumption and the time that is required for the preparation can be reduced, and it becomes possible to reduce the cost for preparation.

In accordance with the substrate for a stamper according to the third invention, the possibility of a non-metallic inclusion being exposed from the surface can be reduced, and it becomes possible to prevent the occurrence of pinhole defects caused by applying metal plating.

In accordance with the substrate for a stamper according to the fourth invention, it becomes possible to easily remove the metal plate by inserting a jig between the metal plate and the platen.

In accordance with the substrate for a stamper according to the fifth invention, such a metal material and metal plating film are used, and thereby, effects as those described above can be expected.

In accordance with the preparing methods for a substrate for a stamper according to the seventh and eighth inventions, the plate thickness of a metal rolled plate that is prepared through rolling is adjusted through metal plating before the polishing process is operated, and therefore, a situation where a portion that cannot be utilized due to a lack in the plate thickness occurs when a polishing process is operated on the metal rolled plate can be prevented, and it becomes possible to maintain a high yield in the preparation. In addition, the thickness of the plating film on a substrate for a stamper can be made smaller than in the case where a thick film of metal plating is generated in accordance with an electroforming method, and therefore, the electric power consumption can be reduced, and it becomes possible to reduce the cost for preparation.

In addition, in accordance with the preparing method for a substrate for a stamper according to the ninth invention, a substrate for a stamper that satisfies the requirements throughout the entire length of a metal rolled plate can be fabricated, and it becomes possible to maintain a high yield in the preparation.

In addition, in accordance with the preparing method for a substrate for a stamper according to the tenth invention, the plate thickness can be adjusted throughout the entire length of a metal rolled plate, and therefore, a substrate for a stamper that satisfies the requirements can be fabricated wherever it is cut out from the metal rolled plate, and it becomes possible to maintain a high yield in the preparation.

In addition, in accordance with the preparing method for a substrate for a stamper according to the eleventh invention, a metal material that is of the same type as the metal material for a metal rolled plate is used, and thereby, thermophysical properties that affect the substrate for a stamper become the same at the time of the formation of an optical disc using the fabricated substrate for a stamper, and therefore, peeling or the like of the plating film is unlikely to occur, and it becomes possible to maintain the substrate for a stamper highly reliable.

In addition, in accordance with the preparing method for a substrate for a stamper according to the twelfth invention, such a metal material and metal plating film are used, and thereby, effects as those described above can be expected.

BEST MODE FOR CARRYING OUT THE INVENTION

In the following, the present invention is concretely described in reference to the drawings showing the embodiments thereof. The quality of the plate material is not particularly limited, and any material for allowing adhesion of a coating film to secure enough strength for the coating film not to peel during the polishing process after the coating process can be used. Here, as for the coating method, any method for providing good adhesion to the plate material, such as metal plating, vapor deposition and pasting can be used.

In addition, it is desirable for the plating material to be a metal plate and a rolled plate, for example, an Ni rolled plate, that has been prepared in accordance with the below described rolling process can be used. Here, as for the material of the rolled plate, titanium, iron, copper, aluminum or the like, in addition to the above, can be used, or it may be an alloy, such as stainless steel.

An Ni rolled plate 1 is prepared through rolling under, for example, the following conditions. Metal nickel is melted, and after that, formed into a slab having a thickness of 150 mm through continuous casting, and this slab is hot rolled so as to have a thickness of 4 mm. Furthermore, it is annealed at 720° C., and after that, washed with an acid, so that oxide scale is removed from the surface, and after that, is cold rolled so as to have a thickness of 0.3 mm, and then, is annealed at 720° C. Furthermore, in the case where bending of the plate becomes a problem, a step of stretching the plate by no greater than 2% may be added, or a step of lightly rolling the plate by no greater than 1% may be added.

An Ni rolled plate 1 that has been wound as a coil having a length of several meters to several tens of meters and a width of 1 m to 2 m in accordance with the above described preparing method has a distribution in the plate thickness with a maximum difference of approximately ±10% in the direction of the length and in the direction of the width.

A process, such as cutting, is operated by means of processing with a known machine on the Ni rolled plate 1 that has been prepared in this manner, and thereby, the Ni rolled plate 1 is processed into a disc form having a diameter D=approximately 160 mm, in accordance with a stamper for duplicating a large amount of optical discs, such as, for example, CD's or DVD's. FIG. 2(a) is a cross sectional diagram showing the Ni rolled plate 1 in disc form having a diameter D=160 mm. Here, the plate thickness is approximately uniform within the range of the diameter D=160 mm that is used as a substrate for a stamper.

Next, as shown in the cross sectional diagram of FIG. 2(b), Ni or Ni alloy plating is operated on the Ni rolled plate 1 that has been processed into a disc form having a diameter D=160 mm. In the plating process, first, the Ni rolled plate that has been processed into a disc form is placed on a hook that has been fabricated of a wire, and a chemical conversion treatment, which is a pre-process of the plating, is operated. In this chemical conversion treatment, the Ni rolled plate is immersed for several seconds in a sodium hydroxide solution with a volume concentration of 5% after a degreasing treatment using, for example, acetone, and subsequently, a treatment by immersion in a hydrochloric acid solution with a volume concentration of 5% for several seconds.

The Ni rolled plate that has been processed into a disc form and on which this chemical conversion treatment has been operated is washed with pure water, and after that, a plating process which is described in detail below is operated. A plating bath that is used in the plating process is not limited to a specific one, and a conventional plating bath may be used. In the case where Ni plating is operated, for example, a sulfamic acid bath or a Watts bath is used, and in the case where Ni alloy plating is operated, an NiP alloy plating bath is used.

In the case where, for example, NiP alloy plating is operated, a plating tank such as SUS 316 steel, which is chemically stable, is used for such a plating bath which is heated to a predetermined temperature (usually 70° C. to 90° C.) by means of a steam coil or an electric heater that is installed within the tank. Here, in order to maintain a uniform composition in the plating bath and a constant temperature, it is preferable to continuously stir the inside of the tank by means of a pump circulation or a stirrer.

Thus, the Ni rolled plate in disc form, on which a chemical conversion treatment has been operated as described above, is hung in the plating tank in a state where the Ni rolled plate is placed on the hook, immersed in the plating bath and lifted up at an appropriate time when the plating layer 2 has attained a predetermined thickness. In the case of NiP alloy plating where a film is formed from electroless plating, the thickness of the plated film is proportional to the length of time of immersion in a plating bath, and therefore, the plating layers 2 having a thickness of 1 μm each can be formed on both the front and rear surfaces, through immersion in the plating bath for five minutes in the case where, for example, the rate of film formation through plating at 80° C. is 12 μm/hour.

The thickness of the plating layers 2 is determined taking polishing margins into consideration. The length of time of immersion of the Ni rolled plate 1 that has been processed into a disc form in the plating bath is determined in accordance with the required thickness of the plating layers 2.

Here, it is desirable for the plating layers 2 to be plated of a metal material or an alloy having a coefficient of linear expansion that is the same as that of the metal rolled plate. When an optical disc is prepared using a stamper that has been fabricated from a substrate for a stamper on which plating of such a material has been operated, it becomes possible to reduce problems such as the peeling of a plating layer due to a difference in the thermophysical properties between the metal rolled plate and the plating layers. Typically, metal plating, having the same compositions as those of the metal material of the metal rolled plate, or alloy plating, having the same main composition as that of the metal material of the metal rolled plate, may be operated. In the case of an Ni rolled plate, for example, plating layers of nickel or plating layers of a nickel alloy such as nickel phosphorous, nickel boron or nickel cobalt, are desirable. Here, in the case where the risk of occurrence of the peeling of the plating is small at the time of the polishing process, the compositions of the plating layers are not particularly limited and coating may be operated in accordance with a method such as vapor deposition, or a coating layer may be formed in accordance with a method such as pasting.

A non-metallic inclusion which lacks conductivity and makes the wettability with the plating solution greatly lower usually exists in the metal material. Accordingly, in the case where a plating process is operated on the surface of a metal plate that is made of such a metal material, portions where no plating layer is formed and which are referred to as so called pinholes are generated. In the case where pinholes are generated, surface coarseness is not sufficiently lowered even when the below described surface polishing process is operated on the surface on which a plating process has been operated. Accordingly, dot formation at the time of signal recording becomes difficult and the metal plate cannot be used as a stamper, and therefore, it is necessary to prevent the occurrence of pinholes.

Therefore, in the case where the below described surface polishing process is operated on the surface on which a plating process has been operated, how much the surface coarseness fluctuates on the basis of the degree of purity, which is the ratio of weight of a non-metallic inclusion that exists in the metal material, is examined when an example of a pure nickel metal material is cited.

Samples for examining the surface coarseness for each degree of purity were gathered from a slab that was prepared through continuous casting after pure nickel had been melted in an electric furnace. In order to have a variety in the degree of purity which is the ratio of weight of the existing non-metallic inclusion, samples for examination were gathered from three portions of the slab that had been prepared through continuous casting, in the vicinity of the upper surface, in the vicinity of the middle and in the vicinity of the final solidified position. In the vicinity of the final solidified position of the slab, the concentration of the non-metallic inclusion became high, and the degree of purity became high (the higher the degree of purity is, the higher the ratio of the existing non-metallic inclusion is). In the vicinity of the middle of the slab, solidification occurs steadily, and therefore, the concentration of the non-metallic inclusion becomes lower than in the vicinity of the final solidified position, and the degree of purity becomes lower (the lower the degree of purity is, the lower the ratio of the existing non-metallic inclusion is).

Next, a slab that is secondarily melted in order to reduce the concentration of the non-metallic inclusion is further gathered from the samples for examination that have been gathered from the vicinity of the middle in the longitudinal direction of the slab that has been prepared through continuous casting. Concretely, a sample for examination having a diameter of 100 mm and a length of 200 mm was gathered and a VAR melting (arc melting) was operated in a vacuum.

Four samples for examination, which were the sample for examination after the VAR melting had been operated, as well as samples for examination that had been gathered from three portions of the slab that had been prepared through continuous casting, in the vicinity of the upper surface, in the vicinity of the middle and in the vicinity of the final solidified position, were hot forged so as to preparation hot stretched slabs having a thickness of 60 mm and a width of 100 mm. Then, these were heated to 1200 degrees, and after that, they were hot rolled so as to have a thickness of 4 mm, and thus, hot rolled plates were gathered as samples for examination.

The hot rolled plates that had been gathered as samples for examination were annealed at 750 degrees, and after that, scale that had occurred on the surface was removed through washing with molten salt and an acid. After that, intermediate annealing was operated at 750 degrees on the hot rolled plates having a thickness of 1 mm, and then, these were cold rolled so as to have a thickness of 0.95 mm.

Four samples in disc form having a diameter of 160 mm were cut out from the plates in a state where cold rolling had been operated, and a polishing process was operated. Sample pieces were gathered from positions of the samples after the polishing process that were at approximately the middle portions of a radius, that is to say positions that were approximately 80 mm away from the center, and the surface coarseness was measured using an atomic force microscope. At the time of measurement of the surface coarseness, the object of the image that was taken was a range of 100 µm 100 µm, and sample pieces of which the average roughness (Ra) exceeded 10 nm, were determined to be defects due to polishing. (Table 1) shows the sampled position, the degree of purity, the average value (Ra) of the surface coarseness and the evaluation for each sample piece, and in the case where a sample piece is determined to be a defect due to polishing, a mark is attached to the item being evaluated.

TABLE 1

| preparing method | sampled position | degree of purity (%) | surface coarseness (Ra) after polishing | evaluation |
|---|---|---|---|---|
| continuous casting | top of cast piece | 0.025 | 4 | ○ |
| | middle of cast piece | 0.013 | 6 | ○ |
| | final solidified position | 0.055 | 15 | |
| continuous casting + VAR melting | middle portion | 0.004 | 2 | ○ |

Here, the evaluation of the degree of purity in (Table 1) was operated using a calculation method of JISG0555. As is clear from (Table 1), in the case where the degree of purity of the non-metallic inclusion in a sample is no greater than 0.05%, surface coarseness Ra after polishing satisfies the condition of being no greater than 10 nm. This is because, in the case where the degree of purity is no greater than 0.05%, the thickness of the metal plate becomes as thin as 0.3 mm, and therefore, the possibility that a non-metallic inclusion exists on the surface of the disc having a diameter of 150 mm is significantly low.

Next, as shown in the cross sectional diagram of FIG. 2(c), a conventional surface polishing process and a rear surface polishing process, or a two surface polishing process where a polishing process is simultaneously operated on both surfaces, front and rear, are operated on an Ni rolled plate 1 in disc form of which the thickness of the plating layer 2 has been adjusted by adjusting the length of time for immersion in a plating bath. Here, it is sufficient for the rear surface polishing process to be a coarse polishing process. Accordingly, a lapping tape to which abrasive particles such as white alumina have been secured is used, and the rear surface is polished so as to have a surface coarseness of Ra=0.05 µm to 0.1 µm.

It is necessary in the surface polishing process to form pits in a sub-micron scale for recording signals on an optical disk that is prepared using the substrate for a stamper according to the present embodiment, and therefore, it is necessary to polish the plate to such a degree that no polishing scratches or the like remain. Accordingly, finished polishing is operated in accordance with, for example, a chemical mechanical polishing method, and thus, surface finish is operated in such a manner that no polishing scratches or the like remain. The final plate thickness after the polishing process becomes approximately 300 μm±5 μm.

In the following, the plate thickness is compared between three plates, an Ni rolled plate, a plate where a polishing process has been operated on an Ni rolled plate without being plated, and a plate where a polishing process has been operated on an Ni rolled plate after being plated. In addition, surface coarseness of the plate where a polishing process has been operated on an Ni rolled plate after being plated is evaluated.

First, as for the plate thickness, the mass of the Ni rolled plate in disk form is divided by the specific gravity of nickel so as to find the volume, and this volume is divided by the area of the circle, and thereby, an average thickness is found and evaluated. As for the specific gravity of nickel, 8.904 g/cm$^3$, which is a bibliographic value, is used.

The uniformity of the plate thickness is confirmed by measuring the distribution of the plate thickness with a measuring instrument such as an ultrasonic plate thickness gauge or a micrometer. In the case where the Ni rolled plate is, for example, in a disk form having a diameter D=160 mm, the uniformity is confirmed by measuring the plate thickness in 17 places in total with pitches of 10 mm to 20 mm, as shown by marks in FIG. 3.

As for the surface coarseness, it is necessary to polish the surface to such a degree that no polishing scratches or the like remain at the final stage, and therefore, the finished state is confirmed by checking the flatness and the existence of scratches on the surface. Concretely, the state of the surface is observed with an atomic force microscope, and the surface coarseness Ra is evaluated.

FIG. 4 is a cross sectional diagram showing the structure of the nickel phosphorus (NiP) alloy plating film that has been formed on the Ni rolled plate. It can be seen from FIG. 4 that a plating film having a uniform thickness is formed on the surface of the Ni rolled plate. Here, the plating film in FIG. 4 is gained through immersion in a plating bath for two hours, and the thickness dm of the plating film has reached approximately 24 μm.

FIG. 5 is a diagram showing the distribution of the film thicknesses of the Ni rolled plate before the polishing process, and the Ni rolled plate where a polishing process has been operated directly without being plated. The longitudinal axis shows the plate thickness (μm) and lateral axis shows the displacement (mm) in the direction of the diameter with the center of the circle being zero. The distribution of the plate thickness of the Ni rolled plate before the polishing process is 305 μm±3 μm as shown by marks ○ in FIG. 5, and it can be seen that a high uniformity is exhibited in a range of a diameter D=160 mm.

The distribution of the plate thickness of such an Ni rolled plate after a polishing process has been operated without being plated is shown by marks + in FIG. 5. Through a slight up and down shift due to the polishing process is seen, the maximum difference of the film thickness is 5 μm. However, the total polishing margin for polishing the front and rear surfaces is approximately 10 μm, and therefore, the plate is polished so as to have the thickness distribution shown by the marks + in FIG. 5 in the case where the polishing process is operated in such a manner that a portion where the plate thickness is smaller than the range of 300 μm±5 μm (shaded portion of FIG. 5) that is required for the final substrate for a stamper, that is to say, a problem arises where a case may occur that the plate can not be used as a substrate for a stamper.

FIG. 6 is a diagram showing the distribution of the plate thicknesses of the Ni rolled plate before the plating process, the Ni rolled plate after the plating process has been operated and the Ni rolled plate where a polishing process has been operated after the plating process. In the same manner as FIG. 5, the longitudinal axis shows the plate thickness (μm) and the lateral axis shows the displacement (mm) in the direction of the diameter with the center of the circle being zero. The distribution of the plate thickness of the Ni rolled plate before the plating process is shown by marks ○ in FIG. 6, which is approximately the same, 303 μm±3 μm, as that shown by the marks ○ in FIG. 5, and it can be seen that a high uniformity is exhibited within a range of a diameter D=160 mm.

A plating process is operated on such an Ni rolled plate for the plating having a thickness 7 μm taking a polishing margin of 10 μm into consideration. Plating layers are formed on both the front and rear surfaces, of the Ni rolled plate, and therefore, a plating process for the plating having a thickness of 3.5 μm may be operated on the Ni rolled plate. In the case of the above described NiP alloy plating, an Ni rolled plate on which a chemical conversion treatment has been operated is immersed in a plating bath for 17 to 18 minutes. The distribution of the plate thickness after the immersion of the Ni rolled plate in a plating bath is shown by marks Δ in FIG. 6. As is clear from FIG. 6, the plating layers are formed while maintaining the uniformity in the plate thickness.

Furthermore, the distribution of the plate thickness in the case where a polishing process is operated after a plating process has been operated on the Ni rolled plate is shown by marks in FIG. 6. Though a slight up and down shift due to the polishing process is seen in the same manner as the marks + in FIG. 5, the maximum difference in the plate thickness is no greater than 5 μm. In addition, a chemical conversion treatment has been operated, and therefore, adhesion of the plating layers to the Ni rolled plate is strong and no local peeling of the plating layers due to the polishing process is observed.

The total polishing margin for polishing the front and rear surfaces is approximately 10 μm, and in the case of the marks in FIG. 6, the thickness becomes in the range of 300 μm±5 μm (shadowed portion of FIG. 6) that is required for the final substrate for a stamper even when the polishing process has been operated, and thus it can be seen that the plate can be used as the substrate for a stamper. Accordingly, the plate thickness throughout the entirety of the substrate that has been cut is increased through the plating process, and thereby, it becomes possible to use a substrate, from whichever portion of the Ni rolled plate the substrate has been cut out, as a substrate for a stamper.

FIG. 7 is an atomic force microscope image of the surface of an Ni rolled plate in the case where surface finishing is operated through a chemical mechanical polishing process on an Ni rolled plate on which a plating process has been operated. As is clear from FIG. 7, the surface of the Ni rolled plate is extremely smooth, and it can be seen that no polishing scratches which may have a risk of causing a problem at the time of signal recording have been generated.

Here, as for the surface coarseness, an arithmetic average coarseness Ra is calculated on the basis of the atomic force microscope image (20 20 μm$^2$) so as to find that the surface coarseness Ra of the Ni rolled plate in accordance with the preparing method for a substrate for a stamper according to the present embodiment is approximately 0.8 nm and has a precise surface finishing that is sufficient for the substrate for a stamper.

In the present embodiment, though plating is operated on both the from and rear surfaces, of a metal rolled plate that has been cut to the size of a stamper and the thickness of this metal rolled plate is adjusted by providing plating layers, the same effects can be expected when the thickness of this metal rolled plate is adjusted by operating a plating process on either surface, front or rear, so as to provide a plating layer only on one of the surfaces.

Here it is necessary to secure the metal (rolled) plate to a mold platen at the time of mastering or at the time of disc formation in the case where the metal plate is used as a stamper substrate. Usually, the metal plate is secured to the mold platen in accordance with a vacuum suction method. However, a slight gap becomes necessary between the flat mold platen and the metal plate in order to secure the metal plate to the mold platen in accordance with the vacuum suction method. That is to say the metal plate to be used as a stamper substrate is in disc form and it becomes necessary for the form to have a convex shape, which faces upward when placed on the mold platen. That is to say, air escapes from the portion beneath the disc of which the center is lifted from the mold platen due to the convex shape, and thereby, the metal plate in disc form is secured to the mold platen. In the present embodiment, the metal plate is appropriately bended, and thereby, the convex shape is gained so as to be lifted from the mold platen when being placed.

In the case where the metal plate is bended slightly, however, a problem arises where removal after the suction becomes difficult even though it is possible to secure the metal plate to the mold platen in accordance with a vacuum suction method. Therefore, the ease of removal after the suction on the basis of the degree of bending was examined.

Concretely, in the case where one end of a metal plate that has been processed so that the outer periphery has a diameter of 160 mm is secured to a mold platen, whether or not it is possible to secure the metal plate to the mold platen in accordance with a vacuum suction method and whether or not it is possible to remove the metal plate after the suction were confirmed on the basis of the size of bending when the distance between the other end of the metal plate and the mold platen is the size of bending. (Table 2) is a table showing the results of confirmation of whether or not it is possible to secure the metal plate to the mold platen in accordance with the vacuum suction method on the basis of the size of bending, and whether or not it is possible to remove the metal plate after the suction. In (Table 2) the marks ○ indicate that it is possible to secure the metal plate to the mold platen in accordance with the vacuum suction method and it is possible to remove the metal plate after the suction, while the mark indicates that the metal plate can not be secured to the mold platen in accordance with the vacuum suction method and it can not be removed after the suction.

TABLE 2

| material | bending (mm) | ease of suction | ease of removal |
| --- | --- | --- | --- |
| Ni | 2 | ○ | ○ |
| Ni | 1 | ○ | ○ |
| Ni | 0.5 | ○ | ○ |
| Ni | 0.2 | ○ | ○ |
| Ni | 0.1 | ○ | ○ |
| Ni | 0.05 | ○ | |

As is clear from (Table 2), in the case where the bending is smaller than 0.1 mm, the gap between the portion of the metal plate that is lifted from the mold platen due to the convex shape and the mold platen is smaller than 0.1 mm, and therefore, it can be seen that it is difficult to remove the metal plate by inserting a jig or the like into the gap even when a gas is injected into this gap after the suction.

Meanwhile, the upper limit value of bending depends on the flatness of the mold platen, the performance of suction and the like. The metal plate is bended by appropriately setting the conditions such as temper rolling and a tension leveler, and a plating process operated on the surface of the metal plate that has been bended, and after that, a polishing process is operated only on the plated portion, and thereby, ease of removal is gained while maintaining ending of the metal plate.

Here, the conditions such as temper rolling and a tension leveler are not particularly limited, and the rate of reduction in pressure, lubrication conditions, the diameters of the rolls, and the peripheral speeds of the upper and lower rolls, in temper rolling as well as the diameters of the rolls and the tension in the tension leveler may be appropriately set so as to gain bending that is designed in the present embodiment.

BRIEF DESCRIPTION OF THE DRAWINGS

FIG. 1 is a diagram showing the distribution of the plate thickness of an Ni rolled plate according to the prior art;

FIG. 5 is a diagram showing the distribution of the plate thickness of an Ni rolled plate according to the prior art;

FIG. 6 is a diagram showing the distribution of the plate thickness of an Ni rolled plate according to an embodiment of the present invention.

EXPLANATIONS OF SYMBOLS

Figure 2:
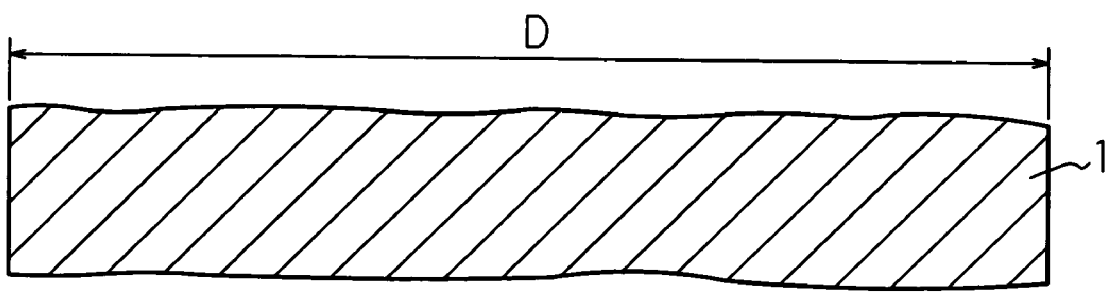
FIGS. 2(a) to 2(c) are diagrams showing a preparing method for a substrate for a stamper according to an embodiment of the present invention.
Figure 2:
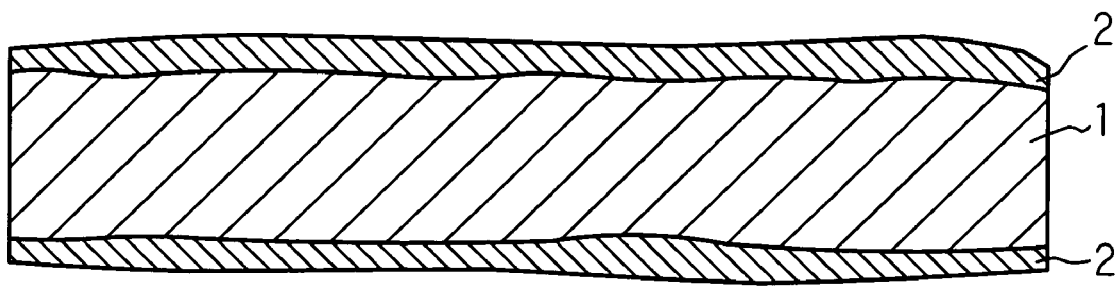
Figure 2:
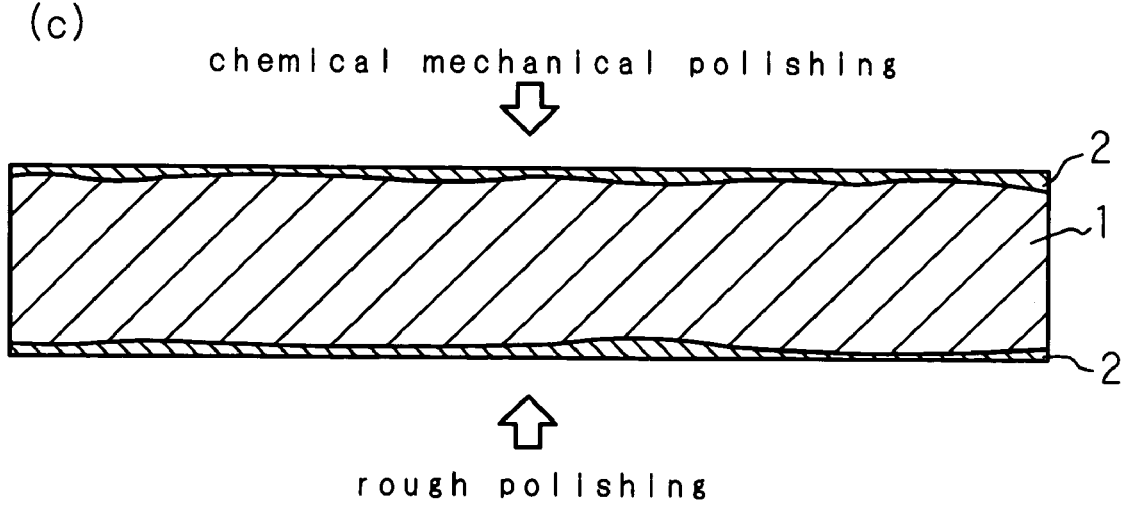
Figure 3:
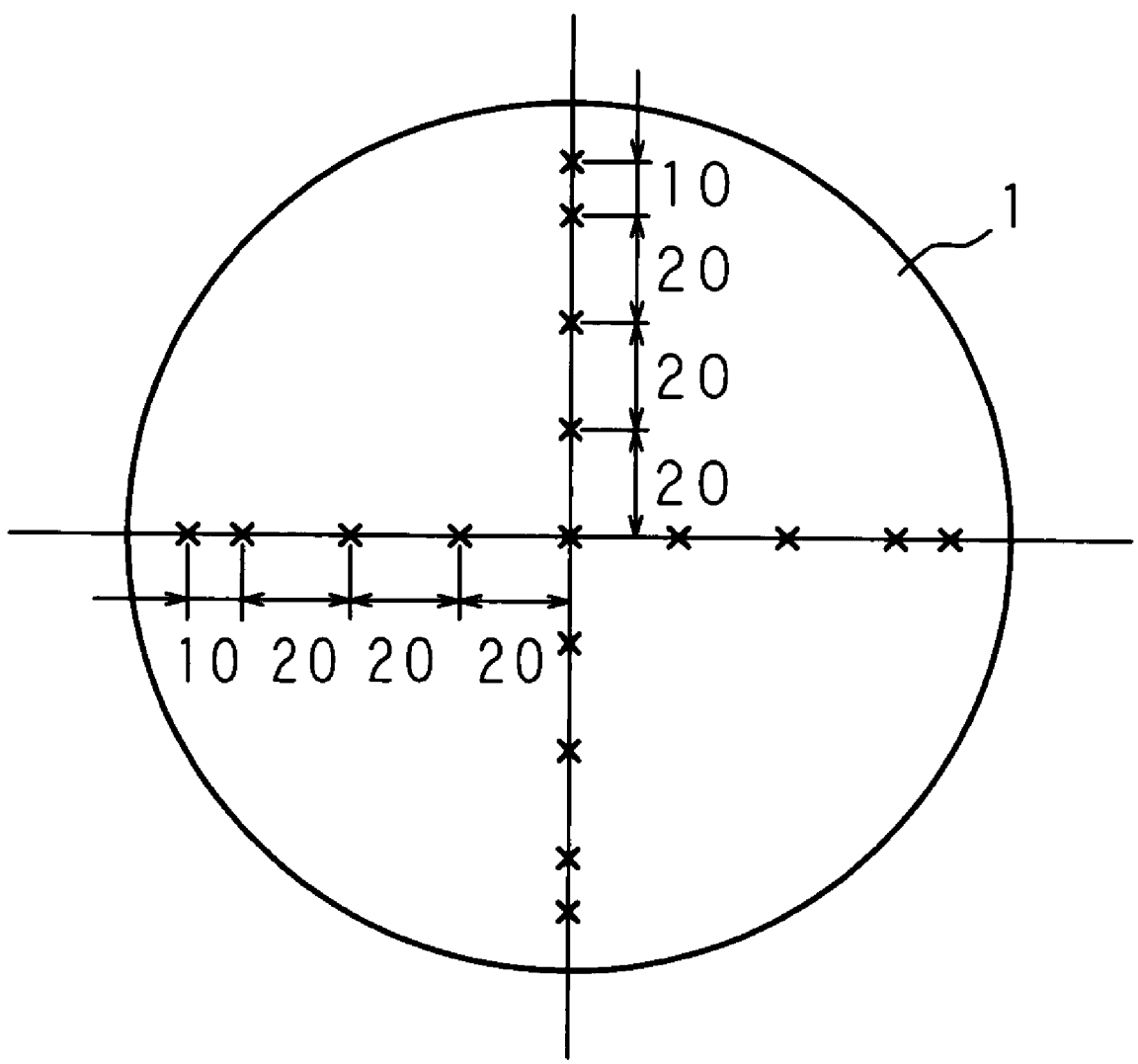
FIG. 3 is a diagram showing a method for confirming the distribution of the plate thickness of an Ni rolled plate.
Figure 4:
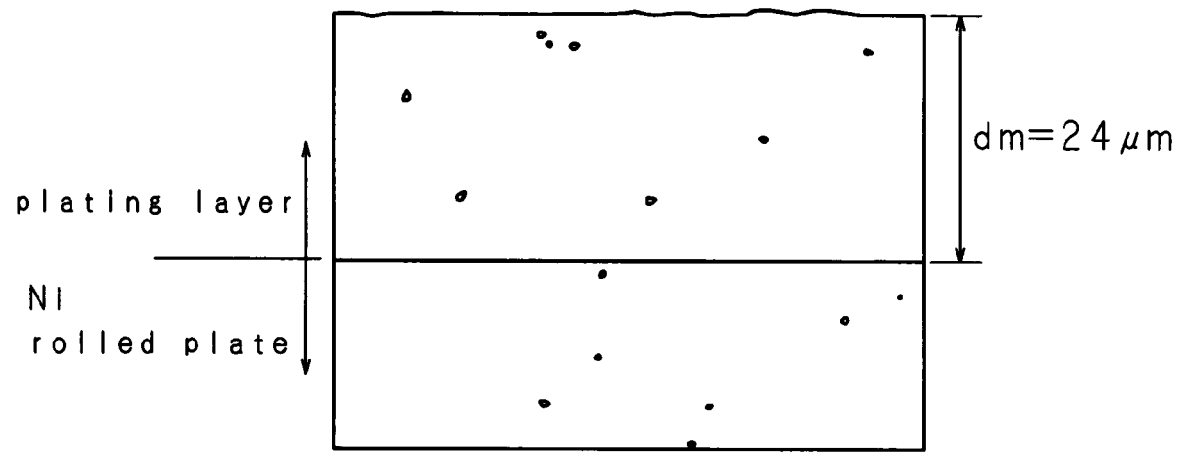
FIG. 4 is a cross sectional diagram showing the structure of an NiP alloy plating film that has been formed on an Ni rolled plate.
Figure 7:
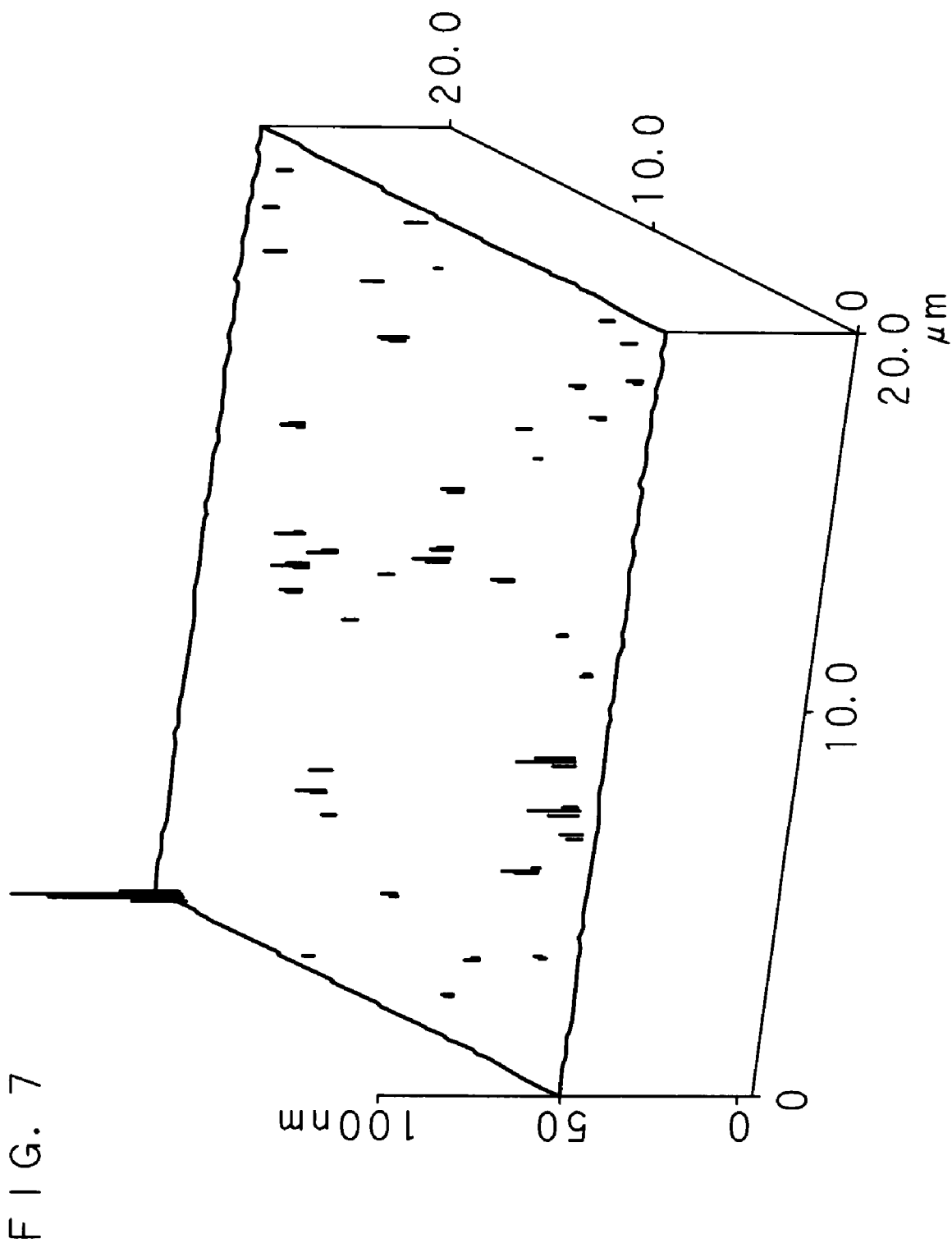
FIG. 7 is a diagram showing an atomic force microscope image of an Ni rolled plate according to an embodiment of the present invention.

1 Ni rolled plate
2 plating layers

The invention claimed is:

1. A substrate for a stamper comprising a plate of metal having a front surface and a rear surface, wherein a degree of purity of a non-metallic inclusion in said plate is no greater than 0.05%, and a metal coating layer is provided on the front surface or the rear surface, or on both of the front and rear surfaces, wherein the plate of metal has a bend, the bend measured as a gap between a first end of the plate and a mold platen, the gap being no less than 0.1 mm, and further wherein the gap is a result of a second end of the plate opposite to the first end being fixed to the mold platen.

2. The substrate of claim 1, wherein said plate of the metal has at least one main composition as follows: pure nickel, nickel alloys, pure titanium, titanium alloys, stainless steel, iron, iron alloys, pure copper, copper alloys, pure aluminum, aluminum alloys, pure magnesium and magnesium alloys.

3. The substrate of claim 1, wherein at least one metal coating layer has an exposed polished surface.

4. The substrate of claim 2, wherein at least one metal coating layer has an exposed polished surface.

* * * * *

UNITED STATES PATENT AND TRADEMARK OFFICE
CERTIFICATE OF CORRECTION

PATENT NO. : 7,641,169 B2
APPLICATION NO. : 11/288166
DATED : January 5, 2010
INVENTOR(S) : Katsuki et al.

It is certified that error appears in the above-identified patent and that said Letters Patent is hereby corrected as shown below:

Title Page, Item [56] under FOREIGN PATENT DOCUMENTS, the following prior art should be included:

| JP | 63-107518   | 5/1988  |
| JP | 2-43380     | 2/1990  |
| JP | 2001-56970  | 2/2001  |
| JP | 2001-283475 | 10/2001 |
| JP | 2002-355749 | 12/2002 |

Signed and Sealed this

Twenty-sixth Day of October, 2010

David J. Kappos
*Director of the United States Patent and Trademark Office*